US012687451B2

(12) United States Patent
Christiansen

(10) Patent No.: US 12,687,451 B2
(45) Date of Patent: Jul. 21, 2026

(54) WIND TURBINE BLADE WITH COUPLING DEVICE DESIGNED TO AUTOMATICALLY DISENGAGE ACTUATOR

(71) Applicant: Siemens Gamesa Renewable Energy A/S, Brande (DK)

(72) Inventor: Soeren Christiansen, Støvring (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 270 days.

(21) Appl. No.: 18/560,009

(22) PCT Filed: Mar. 29, 2022

(86) PCT No.: PCT/EP2022/058306
§ 371 (c)(1),
(2) Date: Nov. 9, 2023

(87) PCT Pub. No.: WO2022/242945
PCT Pub. Date: Nov. 24, 2022

(65) Prior Publication Data
US 2024/0353285 A1　　Oct. 24, 2024

(30) Foreign Application Priority Data
May 19, 2021　　(EP) ..................................... 21174591

(51) Int. Cl.
*G01M 5/00*　　　　(2006.01)
(52) U.S. Cl.
CPC ........ *G01M 5/0016* (2013.01); *G01M 5/0066* (2013.01)
(58) Field of Classification Search
CPC .... G01M 5/0016; G01M 7/022; G01M 7/027; G01M 7/06; G01M 5/00; G01M 13/045;
(Continued)

(56) References Cited

U.S. PATENT DOCUMENTS

2010/0263448 A1* 10/2010 Hughes ................. G01M 7/022
　　　　　　　　　　　　　　　　　　73/577
2017/0241860 A1 　8/2017 Richards et al.
(Continued)

FOREIGN PATENT DOCUMENTS

CN　　　205920020 U　　2/2017
CN　　　107063675 A　　8/2017
(Continued)

OTHER PUBLICATIONS

R&D Test Systems, "Wind turbine blade testing", URL: <https://www.rd-as.com/blade-test-equipment/> Date Accessed: Nov. 9, 2023. 3 Pages.

(Continued)

*Primary Examiner* — Brandi N Hopkins
(74) *Attorney, Agent, or Firm* — Schmeiser Olsen PLLC

(57)　　　　　　ABSTRACT

A test arrangement for fatigue testing a wind turbine blade, wherein a first section of the wind turbine blade is attached to a fixing device and wherein a second section of the wind turbine blade is attached to an excitation device, wherein the excitation device includes an actuator and a coupling device that couples the second section to the actuator in an engaged state, allowing the actuator to exert a force in at least one direction on the second section, wherein the coupling device is designed to automatically disengage, therefore decoupling the actuator from the second section, when a disengagement condition is met, and to automatically return to the engaged state, when an engagement condition is met during the operation of the excitation device.

14 Claims, 3 Drawing Sheets

(58) Field of Classification Search

CPC ....... G01M 7/04; G01M 5/0025; F03D 17/00; F03D 7/0224; F03D 7/0212; F03D 1/0608; F03D 7/0296; F03D 5/06; F03D 17/015; F03D 17/028; B60W 30/18; Y02E 10/72; G01N 3/32; H02P 25/188; H02P 9/00; H02K 16/00; H02K 7/1838; F16H 61/32; F16D 67/02; H01H 35/10; B64C 11/06; F16F 15/18; B23P 19/04

USPC ......................................................... 73/662

See application file for complete search history.

(56) References Cited

U.S. PATENT DOCUMENTS

| | | |
|---|---|---|
| 2017/0292497 A1 | 10/2017 | Asfar |
| 2019/0226959 A1 | 7/2019 | Rampen et al. |

FOREIGN PATENT DOCUMENTS

| | | |
|---|---|---|
| CN | 109374403 A | 2/2019 |
| EP | 2741069 A1 | 6/2014 |
| EP | 3722772 A1 | 10/2020 |
| EP | 3730916 A1 | 10/2020 |
| GB | 408387 A | 4/1934 |
| WO | 2015001405 A1 | 1/2015 |
| WO | 2020216545 A1 | 10/2020 |

OTHER PUBLICATIONS

Blaest: Blade Test Centre: " BLAEST Developed A New Electro-Mechanical Exciter for Fatigue Testing". 2023, Blaest A/S. URL: <https://blaest.com/blaest-developed-a-new-electro-mechanical-exciter-for-fatigue-testing/> Date Accessed: Nov. 9, 2023. 2 Pages.

PCT International Search Report and Written Opinion of International Searching Authority mailed May 16, 2022 corresponding to PCT International Application No. PCT/EP2022/058306 filed Mar. 29, 2022.

Silu et al., A Study of Nonlinear Vibration and Fatigue Experiment on Square Blade, Journal of Air Force Engineering University (Natural Science Edition) vol. 18, No. 5, Oct. 2017, 6 pages (English Abstract).

* cited by examiner

WIND TURBINE BLADE WITH COUPLING DEVICE DESIGNED TO AUTOMATICALLY DISENGAGE ACTUATOR

CROSS-REFERENCE TO RELATED APPLICATIONS

This application claims priority to PCT Application No.PCT/EP2022/058306, having a filing date of Mar. 29, 2022, which claims priority to EP application Ser. No. 21/174,591.4, having a filing date of May 19, 2021, the entire contents both of which are hereby incorporated by reference.

FIELD OF TECHNOLOGY

The following concerns a test arrangement for fatigue testing a wind turbine blade, wherein a first section of the wind turbine blade is attached to a fixing device and wherein a second section of the wind turbine blade is attached to an excitation device, wherein the excitation device comprises an actuator and a coupling device that couples the second section to the actuator in an engaged state, allowing the actuator to exert a force in at least one direction on the second section. Additionally, the following concerns a method for fatigue testing a wind turbine blade.

BACKGROUND

A common approach for fatigue testing of a wind turbine blade is an excitement of oscillations of the wind turbine blade to simulate wear and tear of the blade over an extended amount of time. Typically, the blade that is to be tested is mounted with its base to a fixing device and extends approximately in the horizontal direction away from this fixing device. A second section that is spaced apart from the first section is then excited either by a ground-based exciter or by an exciter mounted to the blade itself.

When using a ground-based exciter, the exciter stroke length is equal to the blade stroke length. Most actuators are most efficient at a certain stroke length, e.g. hydraulics and electrical motors. Hydraulics are e.g. designed for a certain amount of oil that is pumped for each stroke and electrical motors are most efficient at a certain rotational speed, which can be translated into a stroke length at a certain frequency and shaft radius.

In the pursuit of optimal blade fatigue testing conditions, there is a trend to go towards smaller exciter strokes at exciter locations relatively close to the root of the blade. If such short strokes are to be implemented using a motor that continuously rotates, the blade would need to be coupled to the motor shaft at a rather small radius.

A known solution to this problem is the use of a push rod that is coupled to a motor via a gearbox, wherein the motor is controlled to periodically invert its rotational direction and therefore the direction of the gearbox, leading to a limited stroke depth, even when the push rod is mounted at a reasonably large radius. Such excitation devices are e.g. disclosed on the web pages "https://www.rd-as.com/blade-test-equipment/" and "https://blaest.com/blaest-developed-a-new-electro-mechanical-exciter-for-fatigue-testing/".

This approach has two notable disadvantages. On the one hand the need for a gearbox and motor reversal leads to a relatively strong influence of the inertia of the motor and the gearbox on the oscillation which can in turn notably affect the eigenfrequency of the blade. This can have a negative influence on the determination of parameters during the testing of the blade and can also decrease the efficiency of the testing, since it might result in an off-resonance excitation, therefore decreasing the efficiency of the excitation. On the other hand, the reversal of the motor and gearbox can cause a relatively high strain on the motor and gearbox, especially when the blade is to be excited close to the root, which can require large forces to excite the blade. This can lead to a relatively expensive exciter and/or the need to place the exciter further away from the root than would be ideal.

Embodiments of the invention are based on the problem of providing a test arrangement for fatigue testing a wind turbine blade that avoids the previously discussed problems and therefore especially allows for an excitation of the blade close to its root, while still using a relatively simple and inexpensive excitation device.

SUMMARY

This problem is solved by the initially discussed test arrangement, wherein the coupling device is designed to automatically disengage, therefore decoupling the actuator from the second section, when a disengagement condition is met, and to automatically return to the engaged state, when an engagement condition is met during the operation of the excitation device.

In the course of embodiments of the invention, it was found that the previously discussed problems are mainly caused by the actuator, e.g. the motor, being coupled to the wind turbine blade while the direction of the movement of the second section is reversed. In prior art exciters, this reversal of the movement of the blade directly corresponds to a reversal of the movement of the actuator and of an optionally used gearbox. Therefore, the inertia of the actuator and potentially of the gearbox can influence the eigenfrequency of the blade and a large torque can be necessary during the reversal, especially in an off-resonance excitation case.

To avoid these problems, it is proposed to selectively decouple the actuator, e.g. the electric motor and the optionally used gearbox, from the tested wind turbine blade when the disengagement condition is met, especially at times where the movement of the blade is reversed. It becomes therefore e.g. possible to perform an excitement closer to the root of the blade without necessarily increasing the power of the exciter or to use a smaller scaled exciter at the same excitation position than in the case when no such decoupling is performed.

The combination of the fixing device and the excitation device can be considered to be a testing rig for the wind turbine blade. A base of the excitation device is mounted in a fixed position with respect to the fixing device. E.g. the base and the fixing device could both be mounted to the floor of a testing hall. The actuator can then e.g. move at least one component of the excitation device with respect to the base to excite the oscillations of the blade. This component can e.g. be fixed to the blade and it can be decoupled from the actuator by the coupling device when the disengagement condition is met.

The fulfilment of the disengagement condition and/or the engagement condition can correlate to the phase of an oscillation of he second section and/or to a deflection of the second section. It is e.g. possible that the disengagement condition is fulfilled, once the deflection exceeds a certain threshold, and that the engagement condition can be fulfilled, once the deflection falls below this threshold or a further threshold.

It is also e.g. possible to measure or predict the movement of the blade. Therefore, the phase of the oscillation of the second section can directly relate to the time and the fulfilment of the disengagement condition and/or the engagement condition can simply depend on the time. It is e.g. possible to control the actuator to move with a first movement direction for a certain amount of time and then reverse a direction. Since the time at which a reversal of the direction will happen is known, the disengagement can be performed prior to this time. Such a controlled disengagement can e.g. be performed by a clutch that is actuated by a control unit, based e.g. on a time, measured phase and/or deflection, an angular position of the motor, etc.

As will be discussed in more detail below, it is however also possible to design the mechanical coupling within the coupling device in such a way that the automatic disengagement at a certain deflection is an immediate consequence of this mechanical design and therefore a dedicated electronic control is not necessary. An example of such a mechanical design will be described below.

The coupling device can comprise a wheel driven by the actuator and a contact element, especially a plate, that contacts the wheel in the engaged state and that is attached to the second section. The wheel can be directly connected to the actuator or it can e.g. be connected to the actuator via a gearbox.

The connection between the wheel and the contact element can be a frictional connection. It is e.g. possible that the surface of the wheel and/or the contact element is coated with rubber or another high friction material to increase the friction. Alternatively, it would e.g. be possible to use a cog wheel as the wheel that meshes with the contact element that can e.g. be or comprise a rack and therefore provide a form fit with the wheel. The wheel can especially be driven directly or via a gearbox by a rotary motor that is used as the actuator.

When the wheel is turned by the actuator while the coupling device is in the engaged state, the frictional connection or form fit between the wheel and the contact element will shift the contact element with respect to the wheel. Due to the finite dimensions of the contact element the engagement between the wheel and the contact element will be lost once the contact element is shifted beyond a certain distance with respect to the wheel. Therefore, a movement of the contact element for a distance that is larger than a certain threshold from an initial position will lead to the fulfilment of the disengagement condition and therefore to an automatic disengagement of the coupling device, since the contact element and therefore the second section will be decoupled from the actuator in this case.

In the simplest case there will be a stiff connection between the contact element and the second section, e.g. by a pushrod. If the wheel is arranged in such a way that it contacts the contact element in the neutral position of the blade, the coupling device will automatically disengage once the deflection of the blade exceeds a certain threshold and therefore at a certain phase at a given oscillation amplitude. On the other hand, the blade will always return to its neutral position during its oscillations and therefore the wheel will reengage with the contact element, once the deflection gets sufficiently close to zero.

In many cases the same behaviour of the contact element will also result, when the contact element is connected to the second section with a flexible connection segment, e.g. with a wire, e.g. when the connection segment extends essentially vertical, since the connection segment will always be tightened by the weight of the contact element itself and/or a ballast mounted below the contact element. Even when a flexible connection segment extends at an angle, the previously discussed behaviour can be achieved, e.g. by the use of a sufficient ballast as discussed later.

The coupling device can comprise a stop, especially formed as a further wheel, that is spaced apart from the wheel in the radial direction, wherein the contact element contacts both the wheel and the stop in the engaged state. An elastic element can be used to push the wheel in the direction of the stop and/or vice versa and/or the wheel and/or the stop and/or the contact element can be provided with an elastic surface coating to ensure a relatively large force between the wheel and the surface of the contact element and therefore a relatively high frictional between these two components. Additionally or alternatively, it is possible to position the wheel and/or the stop by using a further actuator.

The contact element can be an, especially flat, plate, wherein the connection between the contact element and the second section is formed by or comprises a connection segment having a diameter that is smaller than the thickness of the plate. This embodiment is advantageous, since the contact element is typically moved along a connecting line between the contact element and the second section by turning the wheel. Therefore, the connection segment will be arranged next to the wheel once the plate is shifted beyond a certain distance below the wheel by the movement of the wheel. By using a connection segment that has a diameter that is smaller than the thickness of the plate, a contact between the connection segment and the wheel and/or the stop can be avoided, leading to a decoupling of the wheel from the second section once the contact element is shifted sufficiently far to lose contact with the wheel. The contact element contacts the wheel and/or the stop in the engaged state with a respective surface that is approximately orthogonal to the thickness direction of the plate.

The connection segment can be formed by a string or a wire. The use of a string or a wire instead of a rather long pushrod that would typically be used to connect a ground-based excitation device with the blade can noticeably lower in the cost of the excitation device. If the connection segment would be directly coupled to the actuator or a gearbox as in the initially discussed prior art exciters, the use of a flexible connection segment would result in the drawback, that the connection segment could only be used to pull the blade from an equilibrium position. In the proposed arrangement the connection segment is however used instead to couple the second section to the contact element that can be free hanging from the second section, except for the previously discussed interaction with the wheel and/or stop. Therefore, the weight of the contact element will always provide an additional downward force on the second section and therefore the equilibrium position of the blade will be lowered. This effect can be further increase by attaching an additional ballast to the contact element, e.g. with a further connection segment, especially a string or wire, attached at the bottom of the contact element. In the course of testing embodiments of the invention, the arrangement was e.g. tested with relatively large ballast, e.g. with 10 tons of ballast.

In the equilibrium position of the blade the elastic restoring force of the blade and the weight of the contact element and optionally the ballast are the same. When the actuator is used during the engaged state to push the contact element upward from this equilibrium position, this would at first glance result in a slack of a flexible connection segment connecting the contact element to the second section. This slack is however taken up by a movement of a blade towards its unloaded original equilibrium position, since the movement of the contact element essentially reduces the weight pulling down the blade. Therefore, the actuator can be used to "push" the blade upward from its loaded equilibrium position and for pulling it downward from this position. Due to the described arrangement the actuator can therefore be used to apply forces in both directions, even when a flexible connection segment is used.

The connection segment can extend at an angle to the vertical direction. During blade testing, blades are typically mounted such that the edgewise direction extends horizontally. A vertical connection segment could therefore only apply flapwise forces. With an increasing angle of the connection segment with respect to the vertical direction the fraction of the forces that are applied in edgewise direction can be increased.

Especially in cases when a flexible connection segment is used to connect the contact element to the second section, an arrangement of the contact segment at an angle to the vertical direction at first seems tricky, since a movement of the contact element beyond the wheel and/or stop would lead to a drop of the contact element pulling the connection segment towards the vertical when no additional support is used.

A simple and efficient way to provide such an additional support is the attachment of a ballast below the contact element via a further connection segment. The further connection segment can then e.g. be supported by the wheel or the stop or some further component and the components mounted between this support point and the second section, especially the flexible connection segment, will be kept under tension by the ballast. Therefore, the flexible connection segment will essentially be pulled into a straight line and therefore be kept at an angle to the vertical direction. Therefore the contact element can be fed back towards the wheel or between the wheel and the stop on its return path.

The coupling device can comprise a further actuator that is designed and arranged to move the wheel between a contact position for contacting the contact element in the engaged state of the coupling device and a disengagement position, in which the wheel is decoupled from the contact element. It is especially possible that the wheel is always decoupled from the contact element in the disengagement position, independent of the phase of the oscillation of the second section and/or the deflection of the second section.

In the contact position the wheel can either be always in contact with the contact element or it can only be in contact for certain phases of the oscillation of the second section and/or for certain displacements of the second section.

The further actuator can e.g. be controlled by a control unit. The control can be based e.g. on sensor data concerning the deflection of the second section or the phase of the oscillation of the second section. The use of the further actuator can be especially advantageous when the disengagement condition is evaluated by the control unit, e.g. based on the previously mentioned sensor data.

The excitation device can comprise an additional wheel, that is driven by an additional actuator, and an additional further actuator that is designed and arranged to move the additional wheel between a contact position for contacting the contact element and a disengagement position, in which the additional wheel is decoupled from the coupling device, wherein the or a control unit is designed to control the further actuator and the additional further actuator in such a way that at a given time during the operation of the excitation device the wheel is only in the contact position when the additional wheel is in the disengagement position and vice versa.

The control unit is designed to enable a disengagement of both wheels at the same time, therefore decoupling both actuators from the second section. The control unit can therefore e.g. control both further actuators to disengage both wheels during the reversal of the movement direction of the second section to achieve the previously discussed advantages.

The use of two separate wheels can be advantageous, since this can allow each wheel to continuously operate with the same rotational direction. It is e.g. possible that the two wheels have opposite movement directions or that the wheels contact opposite sides of the contact element and therefore apply forces with opposite directions to the second section when the respective wheel is in contact with the contact element. It is e.g. possible that the wheel is only used to push the second section upward and the further wheel is only used to pull the second section downward or vice versa. Therefore by controlling the further actuators to move the correct wheel into the contact position at the right time, e.g. depending on the phase of the oscillation of the second section or the deflection of the second section that can e.g. be acquired by a sensor, an oscillation of the blade can be driven or a different engagement order can be used to brake down the oscillation.

Both wheels can be driven continuously by the respective actuator while the excitation device is in operation. It would however also be possible to only provide torque by the respective actuator to the respective wheel during certain time intervals, especially comprising the time interval of contact with the contact element.

The exertion of the force on the second section by the wheel and/or the additional wheel can not only be used to excite an oscillation of the blade, but can additionally or alternatively be used to dampen an oscillation of the blade by applying inverse forces. This option is in principle available in all discussed embodiments, even it was only discussed in detail for the embodiment concerning the use of two separate wheels above.

As already mentioned, additional ballast can be attached to the contact element via a further connection segment, especially via a string or wire. As previously discussed, this can especially be advantageous to allow the application of forces in both directions to the second section, even when a flexible connection segment is used between the contact element and the second section, and/or when the use of a flexible connection segment is to be combined with an extension of the connection segment at an angle to the vertical direction.

The actuator and/or the additional actuator can be a rotating motor and/or an electrical actuator. The actuator and/or the additional actuator can especially be an AC-motor, especially an asynchronous or a synchronous AC-motor. A multiphase motor is used. The use of an electrical rotational motor allows for a simpler construction than e.g. the use of a hydraulic linear actuator. Typical drawbacks of an electrical rotational motor as e.g. limited forces that are problematic in the prior art are avoided by the previously discussed features.

The actuator can be controlled by the or a control unit, wherein the control unit is configured to invert the movement direction of the actuator when a reversal condition is met, wherein the coupling device is configured to automatically disengage prior to the inversion of the movement direction in at least one operational state of the excitation device. The fulfilment of the reversal condition can correlate to the phase of an oscillation of the second section and/or to the deflection of the second section. In the simplest case the fulfilment of the reversal condition can be based on a timer, e.g. depending on an expected or measured resonance frequency of the blade.

In some embodiments of the discussed test arrangement a disengagement can only result once a certain minimum amplitude of displacement is reached, e.g. when the contact element is disengaged from the wheel due to the limited extension of the contact element along its movement direction as discussed above. The at least one operational state of the excitation device is therefore given in these cases, once a certain oscillation amplitude of the blade is reached.

Other embodiments can allow for a controllable disengagement, e.g. by the further actuator discussed above. In this case it can even be possible to always disengage the coupling device prior to the reversal of the actuator, e.g. prior to the inversion of the rotation direction of an electrical motor.

The control unit can provide a multiphase alternating current to the actuator, especially to an AC-motor. By adjusting the provided current, the direction of the rotation of the motor can be adjusted, e.g. by inverting the quadrature component of the current when a vector control of the motor is used.

Alternatively, it is possible to always drive the wheel and therefore especially the actuator driving the wheel in the same direction. This was previously discussed for the use of two separate wheels that can alternatively be engaged with the contact element. It is however also possible to use a single wheel to drive the contact element, wherein the wheel is always rotating in the same direction. It is e.g. possible to only use the wheel to exert downward force on the contact element and therefore on the second section via the wheel to drive the oscillation. During an upward movement of the contact element the wheel can therefore always be disengaged. Obviously, the same approach would also be usable to only apply upward forces.

The fulfilment of the reversal condition can depend on measurement data provided by at least one sensor that is designed and arranged to a monitor the position and/or movement of at least one component, especially of the contact element, of the coupling device in the at least one operational state of the excitation device. The sensor can be used to recognize the decoupling, e.g. by detecting a position of the contact element that is spaced apart from the wheel. The sensor can e.g. be a camera and well known approaches, e.g. an edge and/or feature detection, can be used to determine the position and/or movement of the component.

Additionally or alternatively, these parameters can be determined using a distance sensor, e.g. an ultrasound sensor, a radar sensor, an optical time of flight sensor, etc. Additionally or alternatively, it would be possible to use sensors that detect the presence of the component in a certain area, e.g. an optical sensor detecting an interruption of a light beam, an inductive or a capacitive detection of the component, etc.

Besides the test arrangement embodiments of the invention concern a method for fatigue testing a wind turbine blade, wherein a first section of the wind turbine blade is attached to a fixing device, a second section of the wind turbine blade is attached to an excitation device, and an actuator of the excitation device is used to excite an oscillation of the blade, wherein the used excitation device comprises a coupling device that couples the second section to the actuator in an engaged state, allowing the actuator to exert a force in at least one direction on the second section, wherein the coupling device automatically disengages, therefore decoupling the actuator from the second section, when a disengagement condition is met, and automatically returns to the engaged state, when an engagement condition is met during the operation of the excitation device.

Features discussed with respect to the test arrangement according to embodiments of the present invention can be transferred to the inventive method with the discussed advantages and vice versa. The test arrangement according to embodiments of the present invention can especially be used to implement the method according to embodiments of the present invention and/or the method of embodiments of the present invention can especially use the test arrangement according to embodiments of the present invention.

BRIEF DESCRIPTION

Some of the embodiments will be described in detail, with reference to the following figures, wherein like designations denote like members, wherein.

Figure 1:
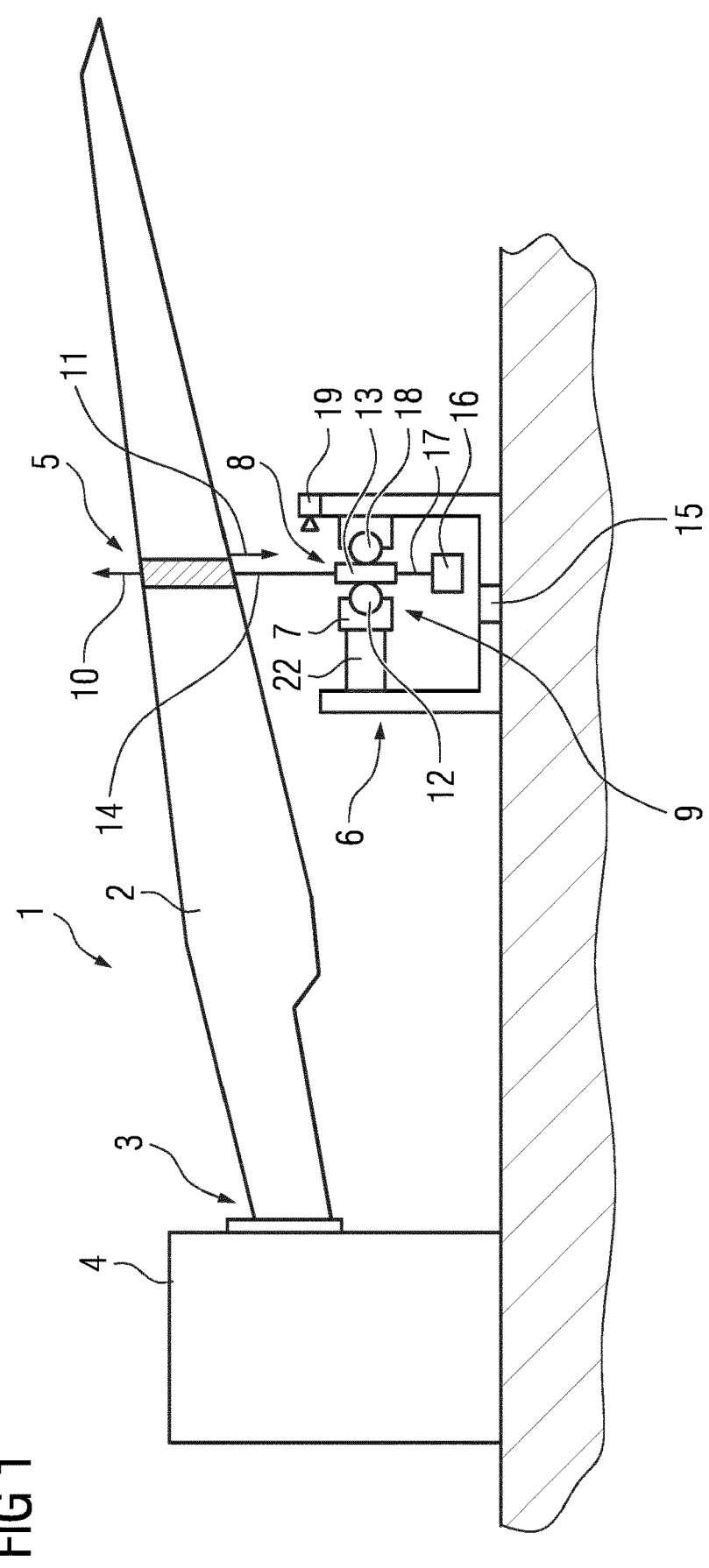
FIG. 1 shows an exemplary embodiment of a test arrangement for fatigue testing a wind turbine blade according to embodiments of the present invention that is usable in an exemplary embodiment of the method for testing a wind turbine blade according to embodiments of the present invention.
Figure 2:
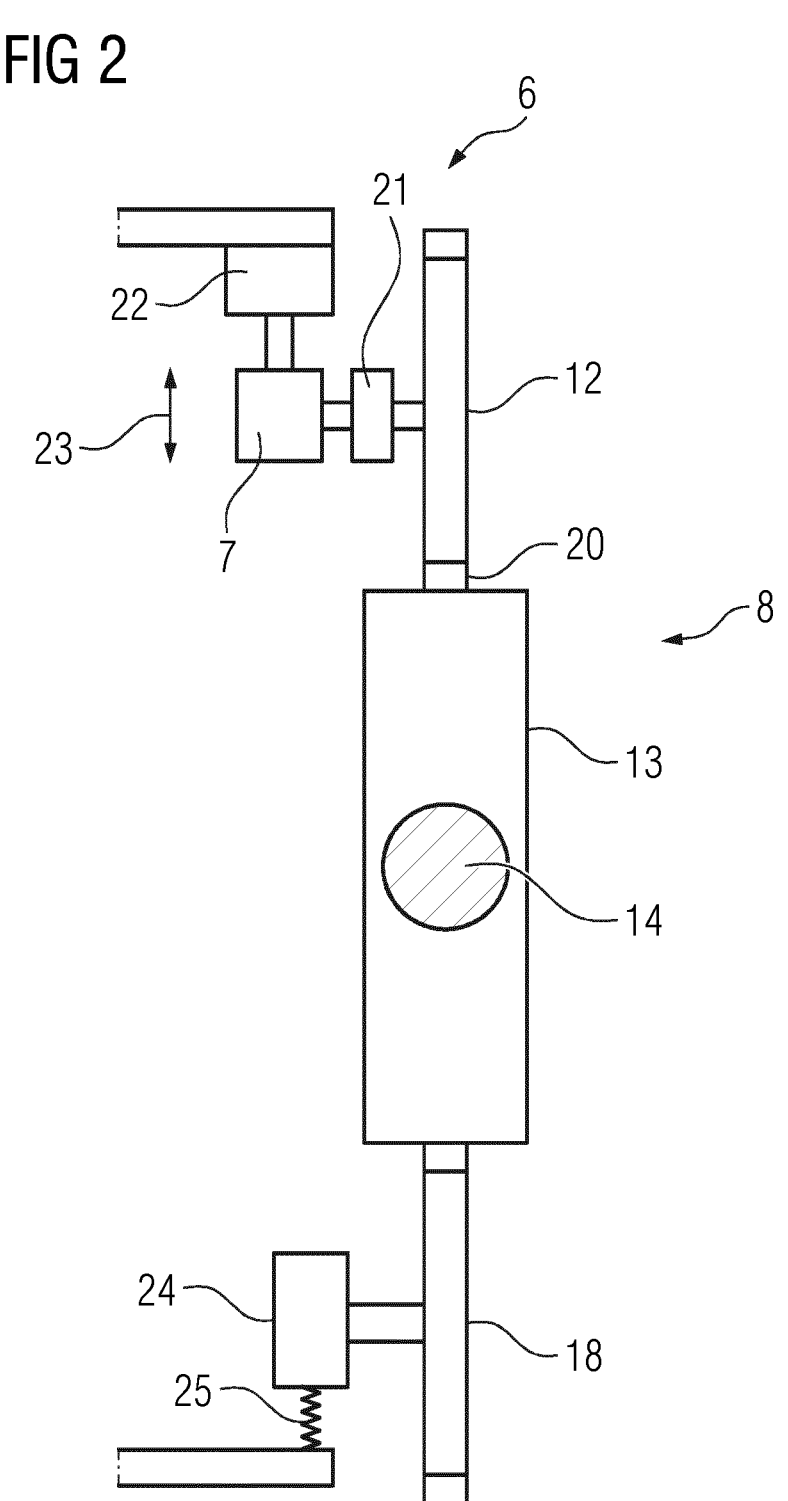
FIG. 2 shows a detailed view of the excitation device used in the test arrangement shown in FIG. 1.
Figure 3:
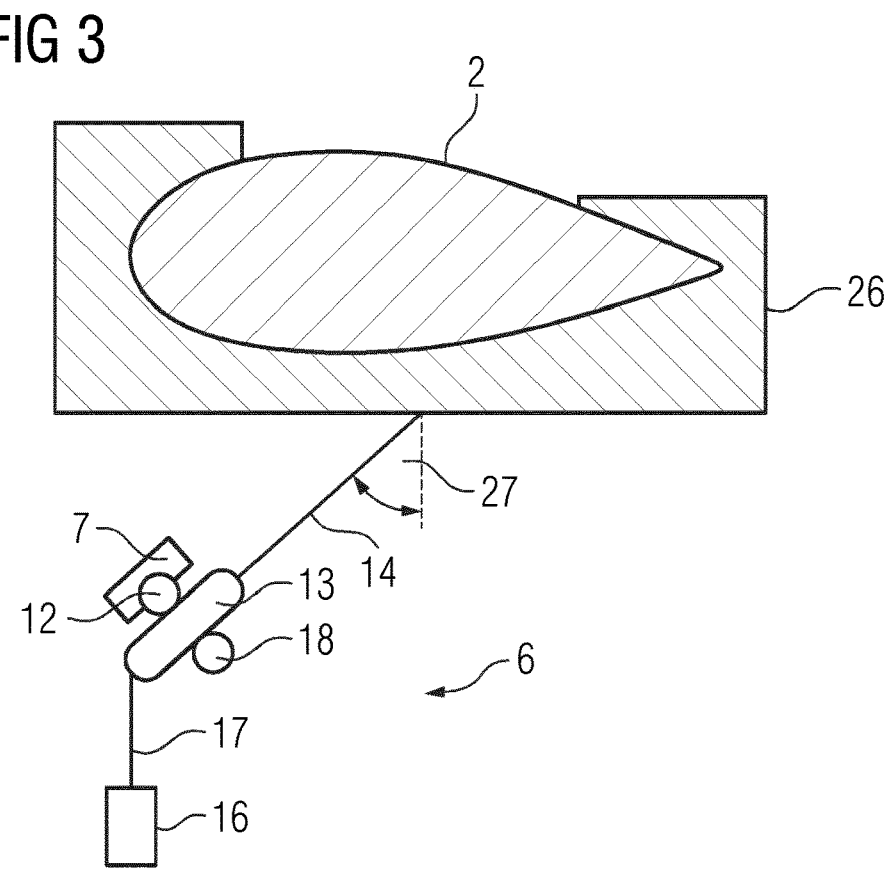
Figure 4:
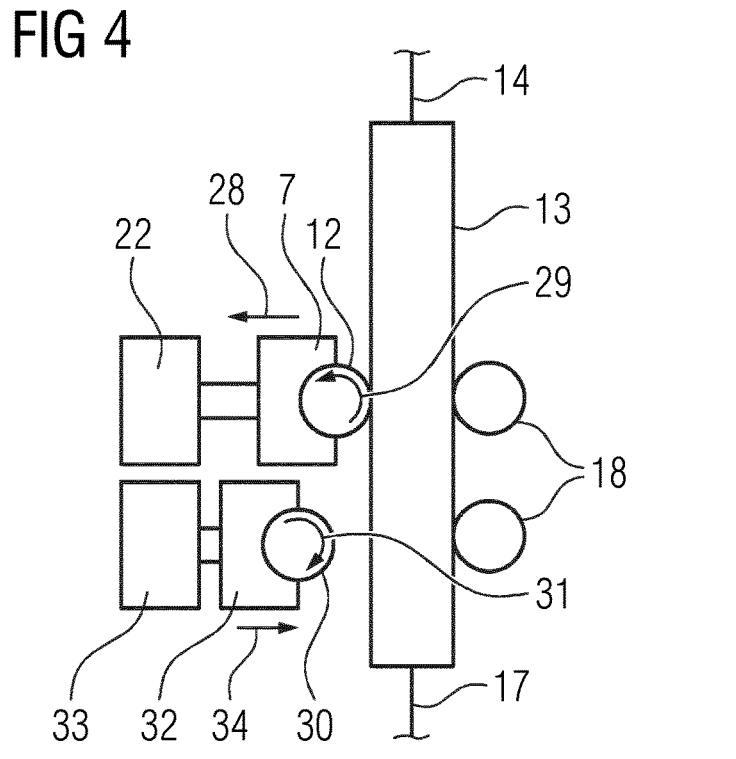

FIG. 3 shows a detailed view of an excitation device that could be used instead of the excitation device shown in FIGS. 1 and 2 in a first different exemplary embodiment of the test arrangement, according to embodiments of the present invention; and FIG. 4 shows a detailed view of an excitation device that could be used instead of the excitation device shown in FIGS. 1 and 2 in a second different exemplary embodiment of the test arrangement, according to embodiments of the present invention.

DETAILED DESCRIPTION

FIG. 1 shows a test arrangement 1 for fatigue testing a wind turbine blade 2. To perform this test, a test rig comprising the fixing device 4 and an excitation device 6 is used. A section 3 of the blade 2, especially the root of the blade 2, is attached to the fixing device 4. A second section 5 that is spaced apart from the first section 3 is attached to an excitation device 6, e.g. via a harness. The excitation device 6 can be used to drive oscillations of the blade 2 by, especially periodically, exerting a force in at least one direction on the second section 5. By exciting these oscillations, the fatigue of using the wind turbine blade 2 over extended amounts of time can be simulated in a relatively short time and therefore a fatigue testing of the wind turbine blade can be performed.

The excitation device 6 comprises an actuator 7 and a coupling device 8 that couples the second section 5 to the actuator 7 in an engaged state 9 shown in FIG. 1. Therefore, the actuator 7 can exert a force on the second section 5.

The actuator 7 can e.g. be an electric motor that is driven by the control unit 15. The control unit 15 can e.g. provide a multiphase alternating current to the actuator 7 and can be used to determine the direction of rotation of the actuator. As already discussed in detail in the general section of the description, a fixed coupling of the movement of the actuator 7 to the movement of the second section 5 could strongly influence the resonance frequency of the oscillations of the blade 2 and lead to a heavy loading of the actuator 7 and of an optional gearbox not shown in FIG. 1, when the direction of rotation of the actuator 7 is reversed.

To avoid these problems, the test arrangement 1 shown in FIG. 1 uses a coupling device 8 that is a desired to automatically disengage, when a disengagement condition is met, e.g. when a reversal of the direction of the rotation of the actuator 7 should be performed, therefore decoupling the actuator 7 from the second section 5. The coupling device 8 does however automatically return to an engaged state 9, when an engagement condition is met during the operation of the excitation device 6, e.g. when the blade 2 is close to the neutral position that is shown in FIG. 1 during the oscillation.

A possible implementation of this automatic disengagement and engagement will now be discussed with additional reference to FIG. 2 that show a detailed view of the coupling device 8, wherein the image plane is orthogonal to the image plane in FIG. 1 and interacts the connection segment 14 shown in FIG. 1. To show a majority of the relevant components already in FIG. 1 without sacrificing clarity, a certain amount of inconsistency concerning the placement and scaling of the different components between FIGS. 1 and 2 was tolerated. While the arrangement shown in FIG. 1 only schematically shows the interaction of the different components, the more detailed view in FIG. 2 provides more details concerning a possible implementation.

The core idea of the shown embodiment is the use of a wheel 12 that is driven by the actuator 7, in the example via a gearbox 21, and that contacts a contact element 13, in the example a plate, in the engaged state 9, wherein the contact element 13 is in turn coupled to the second section 5 of the turbine blade 2, in the example via a connection segment 14 that can especially be a wire or a string. The connection segment 14 can e.g. be connected to the second section 5 via a harness or some other means.

Due to this arrangement a rotation of the wheel 12 and therefore a rotation of the actuator 7 is converted into a vertical movement of the contact element 13. To improve the coupling between the wheel 12 and the contact element 13 several measures are used in the example shown in FIG. 2. It is obviously possible to only use some of these measures or to combine these measures with other measures to increase the coupling.

Firstly, the coupling device comprises a stop 18 that is formed as a further wheel in the shown example. The stop 18 is spaced apart from the wheel 12 in the radial direction of the wheel and the contact element 13 contacts both the wheel 12 and the stop 18. To avoid frictional losses, the stop 18 is also formed as a further wheel in the embodiment shown in FIG. 2.

Secondly, the bearing 24 of this further wheel is pushed in the direction of the wheel 12 by an elastic element 25, therefore increasing the friction between the wheel 12 and the contact element 13.

Thirdly, a rubber coating 20 is used on the wheel 12 and the stop 18 to further improve this coupling.

Additionally the position of the actuator 7 and therefore of the wheel 12 can also be changed by the further actuator 22 as shown by the arrow 23. Therefore a well-defined force between the wheel 12 and the contact element 13 and therefore a well-defined coupling can be achieved.

As shown in FIG. 1, the coupling element 13 has a finite length in the vertical direction. Therefore, the coupling element 13 will lose contact to the wheel 12 once it is shifted in the vertical direction for a certain distance.

When the connection segment 14 is essentially straight as shown in FIG. 1, e.g. due to being an essentially stiff pushrod or due to the weight of the contact element 13 and the optional ballast 16 that is attached to the contact element 13 via a further connection segment 17, the vertical position of the contact element 13 corresponds to the vertical position of the second section 5. Therefore, once the displacement 10, 11 of the second section 5 exceeds a certain threshold, the wheel 12 loses contact to the contact element 13 and therefore the wheel 12 and therefore the actuator 7 are decoupled from the second section 5.

To robustly achieve such a decoupling the connection segments 14, 17 should have a noticeably smaller diameter than the distance between the wheel 12 and the stop 18 and therefore the extension of the contact element 13 in this direction. With this structure the previously discussed automatic decoupling and return to the engaged state can be implemented with low technical complexity.

It should be noted, that the example shown in FIG. 2 shows a relatively large extension of the contact element 13 between the wheel 12 and the stop 18 and a relatively small extension orthogonal to this direction. These dimensions were chosen to more clearly illustrate the used principles. In real life applications, it is often advantageous to use a plate as the contact element 13 and have the wheel 12 and the stop 18 contact the two largest surfaces of these plate.

While the previously discussed automatic decoupling due to the finite size of the contact element 13 allows for this decoupling once a certain amplitude of the oscillation of the blade 2 is reached and therefore for the most relevant application case, it can be desirable to also allow for a decoupling at small amplitudes or in other selected cases. Therefore, the control unit 15 can also actively control the further actuator 22 to move the actuator 7 and therefore the wheel 12 as shown by the arrow 23 in FIG. 2 to disconnect the wheel 12 from the contact element 13. It is e.g. possible to only move the wheel 12 in a contact position in which it contacts the contact element 13 when there is no planed change of the movement direction of the actuator 7 and especially when the rotational speed of the wheel 12 is closely matched to a vertical movement speed of the contact element 13.

The control unit 15 can invert the movement direction of the actuator 7 when a reversal condition is met, wherein the coupling device 8 can be configured to automatically disengage prior to the inversion of the movement direction in at least one operational state of the excitation device. This behaviour can be easily achieved when an active decoupling via the actuator 22 is used. In this case the control unit 15 simply needs to trigger an active disengagement by controlling the actuator 22 to move the wheel 12 away from the contact element 13 prior to the change of the current provided to the actuator 7 used to invert its movement direction.

When an automatic disengagement due to the finite size of the contact element 13 is used, the disengagement can e.g. be supervised by a sensor 19, e.g. a camera. From the sensor data the control unit 15 can e.g. detect edges of the contact element 13 and therefore its position relative to the wheel 12. A reversal of the movement direction of the actuator 7 and therefore of the wheel 12 can then be triggered, when it is detected that the contact element 13 is spaced apart from the wheel 12.

Measurement data of the sensor 19 can additionally or alternatively be used to match the rotational speed of the wheel 12 to the vertical speed of the contact element 13 prior to a reengagement of these components.

In the example according to FIGS. 1 and 2 a vertical extension of the connection segment 14 and a vertical movement of the contact element 13 is used. In typical test rigs, the wind turbine blade 2 is mounted to the fixing device 4 in such a way that the plane defined by the edges of the blade is approximately horizontal. A vertical movement of the contact element therefore leads to an application of purely flapwise forces. To also apply edgewise forces, it might be advantageous to use a connection segment 14 that extends at an angle 27 to the vertical direction and to move the contact element 13 also at an angle to the vertical direction as shown in FIG. 3. FIG. 3 also schematically shows the use of harness 26 for attaching the excitation device 6 to the blade 2. For simplicities sake only the most relevant components of the excitation device 6 are shown.

It should be noted that the shown arrangement can even be used, when a flexible connection segment 14 is used, as long as a sufficiently large ballast 16 is used. Without the use of the ballast 16, a movement of the contact element 13 to the upper right-hand side in FIG. 3 beyond the stop 18 would result in a drop of the contact element 13, therefore pivoting the connection segment 14 towards the vertical direction. This would result in a permanent loss of contact between the wheel 12 and the contact element 13.

When using a sufficiently large ballast 16, the stop 18 will still support the further connection segment 17 when the contact element 13 has moved past the stop 18. The ballast 16 will therefore pull the connection segment 14 into an essentially straight line and the connection segment 14 will therefore stay at an angle with respect to the vertical direction. Therefore, the contact element 13 will be pulled back between the wheel 12 and the stop 18 when the blade 2 is returning to its neutral position shown in FIG. 3. The excitation device 6 can therefore easily operate at an angle 27 as shown in FIG. 3.

The previous examples use a single wheel that changes direction to exert forces in both directions onto the second section 5. Alternatively, it would be possible to only use a single direction of rotation of the wheel 12 and e.g. only put the wheel 12 into the contact position shown in FIGS. 1 and 2 during a downward movement of the second section 5 to apply further downward force to the section 5. The wheel 12 could be completely disconnected from the contact element 13 via the further actuator 22 during the upward movement of the blade 2 and therefore the contact element 13.

When a change of the movement direction of the wheel 12, 30 should be avoided and it should still be possible to apply forces in both directions to the second section 5, the alternate embodiment shown in FIG. 4 can be used. In this embodiment the wheel 12 is continuously rotating in the counter clockwise direction as indicated by the arrow 29 and the wheel 30 is continuously rotating in the clockwise direction as indicated by the arrow 31.

The further actuators 22, 33 can move the wheels 12, 30 between a contact position shown for the wheel 12 in which the respective wheel 12, 30 contacts the contact element 13 and a disengagement position shown for the wheel 30 in which the respective wheel 12, 30 does not contact the contact element 13.

The state shown in FIG. 4 can be used during an upward movement of the contact element 13. After certain upward displacement the control unit that is not shown in FIG. 4 can control the further actuator 22 to move the wheel 12 into the disengagement position as indicated by the arrow 28 and therefore decouple the actuator 7 from the second section.

Once the contact element 13 has started to move downwards due to the oscillation of the blade 2, the further actuator 33 can move the wheel 30 into the engagement position as indicated by the arrow 34 and therefore couple the actuator 32 to the second section to apply a downward force to the second section. Therefore, forces can be applied in both directions to the second section of the blade, even when the wheels 12, 30 and especially the actuators 7, 32 driving these wheels 12, 30 do not reverse their direction.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A test arrangement for fatigue testing a wind turbine blade, comprising:
   a fixing device, wherein a first section of the wind turbine blade is attached to the fixing device; and
   an excitation device, wherein a second section of the wind turbine blade is attached to the excitation device, the excitation device comprising an actuator and a coupling device that couples the second section to the actuator in an engaged state, allowing the actuator to exert a force in at least one direction on the second section;
   wherein the coupling device is designed to automatically disengage, therefore decoupling the actuator from the second section, when a disengagement condition is met, and to automatically return to the engaged state, when an engagement condition is met during an operation of the excitation device;
   wherein the coupling device comprises a wheel driven by the actuator and a contact element that contacts the wheel in the engaged state and that is attached to the second section.

2. The test arrangement according to claim 1 wherein a fulfilment of the disengagement condition and/or of the engagement condition correlates to a phase of an oscillation of the second section and/or to a deflection of the second section.

3. The test arrangement according to claim 1, wherein the coupling device comprises a stop, formed as a further wheel, that is spaced apart from the wheel in a radial direction, wherein the contact element contacts both the wheel and the stop in the engaged state.

4. The test arrangement according to claim 1, wherein the contact element is a flat plate, wherein a connection between the contact element and the second section is formed by or comprises a connection segment having a maximum diameter that is smaller than a thickness of the flat plate.

5. The test arrangement according to claim 4, wherein the connection segment is formed by a string or wire.

6. The test arrangement according to claim 4, wherein the connection segment extends at an angle to a vertical direction.

7. The test arrangement according to claim 1, wherein the coupling device comprises a further actuator that is designed and arranged to move the wheel between a contact position for contacting the contact element in the engaged state of the coupling device and a disengagement position, in which the wheel is decoupled from the contact element.

8. The test arrangement according to claim 7, wherein that the excitation device comprises an additional wheel, that is driven by an additional actuator, and an additional further actuator that is designed and arranged to move the additional wheel between a contact position for contacting the contact element and a disengagement position, in which the additional wheel is decoupled from the coupling device, wherein a control unit is designed to control the further actuator and the additional further actuator in such a way that at a given time during the operation of the excitation device the wheel is only in the contact position when the additional wheel is in the disengagement position and vice versa.

9. The test arrangement according to claim 8, wherein the actuator and/or the additional actuator is a rotating motor and/or an electromechanical actuator.

10. The test arrangement according to claim 1, wherein a ballast is attached to the contact element via a further connection segment, via a string or wire.

11. The test arrangement according to claim 1, wherein the actuator is controlled by the or a control unit, wherein the control unit is configured to invert a movement direction of the actuator when a reversal condition is met, wherein the coupling device is configured to automatically disengage prior to an inversion of the movement direction in at least one operational state of the excitation device.

12. The test arrangement according to claim 11, wherein a fulfilment of the reversal condition depends on measurement data provided by at least one sensor that is designed and arranged to monitor a position and/or a movement of at least one component of the contact elementor of the coupling device in the at least one operational state of the excitation device.

13. A method for fatigue testing a wind turbine blade, wherein attaching a first section of the wind turbine blade to a fixing device, attaching a second section of the wind turbine blade to an excitation device, and utilizing an actuator of the excitation device to excite an oscillation of the wind turbine blade, wherein the excitation device comprises a coupling device that couples the second section to the actuator in an engaged state, allowing the actuator to exert a force in at least one direction on the second section, wherein the coupling device automatically disengages, therefore decoupling the actuator from the second section, when a disengagement condition is met, and automatically returns to the engaged state, when an engagement condition is met during an operation of the excitation device;

wherein the coupling device comprises a wheel driven by the actuator and a contact element that contacts the wheel in the engaged state and that is attached to the second section.

14. A test arrangement for fatigue testing a wind turbine blade, comprising:

a fixing device, wherein a first section of the wind turbine blade is attached to the fixing device; and an excitation device, wherein a second section of the wind turbine blade is attached to the excitation device, the excitation device comprising an actuator and a coupling device that couples the second section to the actuator in an engaged state, allowing the actuator to exert a force in at least one direction on the second section;

wherein the coupling device is designed to automatically disengage, therefore decoupling the actuator from the second section, when a disengagement condition is met, and to automatically return to the engaged state, when an engagement condition is met during an operation of the excitation device;

wherein the actuator is controlled by the or a control unit, wherein the control unit is configured to invert a movement direction of the actuator when a reversal condition is met, wherein the coupling device is configured to automatically disengage prior to an inversion of the movement direction in at least one operational state of the excitation device.

\* \* \* \* \*